(12) United States Patent
Knas et al.

(10) Patent No.: US 11,201,842 B1
(45) Date of Patent: Dec. 14, 2021

(54) SYSTEMS, DEVICES, AND METHODS FOR PRESENTING CONVERSATION MESSAGES IN MESSENGER APPLICATIONS

(71) Applicant: MASSACHUSETTS MUTUAL LIFE INSURANCE COMPANY, Springfield, MA (US)

(72) Inventors: Michal Knas, Monson, MA (US); Jiby John, Suffield, CT (US); Payton A. Shubrick, Springrield, MA (US); Damon Ryan Depaolo, Barkhamsted, CT (US)

(73) Assignee: MASSACHUSETTS MUTUAL LIFE INSURANCE COMPANY, Springfield, MA (US)

( * ) Notice: Subject to any disclaimer, the term of this patent is extended or adjusted under 35 U.S.C. 154(b) by 0 days.

(21) Appl. No.: 16/983,682

(22) Filed: Aug. 3, 2020

Related U.S. Application Data (63) Continuation of application No. 16/124,074, filed on Sep. 6, 2018, now Pat. No. 10,735,363.

(60) Provisional application No. 62/555,465, filed on Sep. 7, 2017.

(51) Int. Cl.
*H04L 12/58* (2006.01)
*G06F 3/048* (2013.01)

(52) U.S. Cl.
CPC .............. *H04L 51/16* (2013.01); *G06F 3/048* (2013.01); *H04L 51/02* (2013.01); *H04L 51/04* (2013.01); *H04L 51/22* (2013.01)

(58) Field of Classification Search
CPC ...... H04L 51/00–51/22; G06F 3/048–3/04883
See application file for complete search history.

(56) References Cited

U.S. PATENT DOCUMENTS

| | | | |
|---|---|---|---|
| 7,120,455 B1 * | 10/2006 | Chen | H04L 51/04 455/466 |
| 7,873,996 B1 * | 1/2011 | Emigh | H04L 51/12 726/22 |
| 2008/0055269 A1 | 3/2008 | Lemay et al. | |
| 2008/0122796 A1 | 5/2008 | Joes et al. | |
| 2016/0132990 A1 * | 5/2016 | Zhang | G09G 5/00 345/646 |
| 2017/0063767 A1 | 3/2017 | Lukas et al. | |
| 2020/0125701 A1 * | 4/2020 | Isaac | G06F 21/31 |

OTHER PUBLICATIONS

Dube, 25+ Outlook Keyboard Shortcuts to Make You More Productive, Feb. 18, 2016, Make Use of, p. 1-24 (Year: 2016).*

* cited by examiner

*Primary Examiner* — Clayton R Williams
(74) *Attorney, Agent, or Firm* — Foley & Lardner LLP (57) ABSTRACT

This disclosure discloses a technique for presenting a conversation message in a messenger application.

20 Claims, 3 Drawing Sheets

SYSTEMS, DEVICES, AND METHODS FOR PRESENTING CONVERSATION MESSAGES IN MESSENGER APPLICATIONS

CROSS-REFERENCE TO RELATED APPLICATIONS

This application is a continuation application of U.S. patent application Ser. No. 16/124,074, filed Sep. 6, 2018, which claims a benefit of U.S. Provisional Application No. 62/555,465, filed on Sep. 7, 2017, all of which are incorporated by reference in their entirety.

TECHNICAL FIELD

Generally, this disclosure relates to a graphical user interface. More particularly, this disclosure relates to a messenger application.

BACKGROUND

A messenger application, such as a text messenger or a chat messenger, presents a conversation in a sequential time order, such as in an ascending manner, along a vertical plane. However, the messenger application can overwhelm a user thereof when the conversation includes a plurality of messages, especially when the messenger application receives the messages in a rapid succession, such as when the conversation involves a chatbot or a large group of participants. Further, if the messenger application is displayed via a desktop display or a laptop and the conversation contains a set of sensitive data, such as an alphanumeric string or an image, then there may be a desire to hide the sensitive data in a presence of a third party, such as a bystander or an onlooker, and yet still continue the conversation, without turning off the desktop display or closing the laptop. Additionally, some displays present a plurality of windows simultaneously and, due to limited display space, the windows may overlap and obscure at least some content of underlying windows. This state of being becomes even more problematic with small display sizes, such as mobile phones, tablets, or others, especially when the set of sensitive data may be displayed.

SUMMARY

In an embodiment, there is provided a method comprising: requesting, by a processor, a conversation area to be displayed by a display, wherein the conversation area includes a message portion and an empty portion, wherein the message portion includes a first message; receiving, by the processor, a second message after the first message; determining, by the processor, a total number of messages that would be concurrently included in the message portion with the second message; comparing, by the processor, the total number of messages against a threshold; requesting, by the processor, the message portion to be modified by the display responsive to the total number of messages satisfying the threshold such that the first message is not included in the message portion and the second message positionally replaces the first message in the message portion; requesting, by the processor, a notification to be displayed by the display such that the conversation area includes the notification, wherein the notification is configured to switch between a first status and a second status based on a first user input and a second user input respectively, wherein the first message is included in the empty portion during the first status responsive to the first user input and the notification is more visually distinct during the first status than the second status, wherein the first message is not included in the empty portion during the second status responsive to the second user input and the notification is less visually distinct during the second status than the first status.

In an embodiment, there is a provided an apparatus comprising: a processor; a display coupled to the processor; a user input device coupled to the processor; a memory coupled to the processor, wherein the memory stores a set of instructions configured for execution by the processor such that the processor is configured to: request a conversation area to be displayed by the display, wherein the conversation area includes a message portion and an empty portion, wherein the message portion includes a first message; receive a second message after the first message; determine a total number of messages that would be concurrently included in the message portion with the second message; compare the total number of messages against a threshold; request the message portion to be modified by the display responsive to the total number of messages satisfying the threshold such that the first message is not included in the message portion and the second message positionally replaces the first message in the message portion; request a notification to be displayed by the display such that the conversation area includes the notification, wherein the notification is configured to switch between a first status and a second status based on a first user input and a second user input respectively, wherein the first message is included in the empty portion during the first status responsive to the first user input and the notification is more visually distinct during the first status than the second status, wherein the first message is not included in the empty portion during the second status responsive to the second user input and the notification is less visually distinct during the second status than the first status.

In an embodiment, there is a provided a device comprising: a non-transitory storage medium storing a set of instructions configured for execution by a processor such that the processor is configured to: request a conversation area to be displayed by a display, wherein the conversation area includes a message portion and an empty portion, wherein the message portion includes a first message; receive a second message after the first message; determine a total number of messages that would be concurrently included in the message portion with the second message; compare the total number of messages against a threshold; request the message portion to be modified by the display responsive to the total number of messages satisfying the threshold such that the first message is not included in the message portion and the second message positionally replaces the first message in the message portion; request a notification to be displayed by the display such that the conversation area includes the notification, wherein the notification is configured to switch between a first status and a second status based on a first user input and a second user input respectively, wherein the first message is included in the empty portion during the first status responsive to the first user input and the notification is more visually distinct during the first status than the second status, wherein the first message is not included in the empty portion during the second status responsive to the second user input and the notification is less visually distinct during the second status than the first status.

DESCRIPTION OF DRAWINGS

The set of accompanying illustrative drawings shows various embodiments of this disclosure. Such drawings are not to be construed as necessarily limiting this disclosure. Like numbers and/or similar numbering scheme can refer to like and/or similar elements throughout.

DETAILED DESCRIPTION

This disclosure is now described more fully with reference to the set of accompanying drawings, in which some embodiments of this disclosure are shown. This disclosure may, however, be embodied in many different forms and should not be construed as necessarily being limited to the embodiments disclosed herein. Rather, these embodiments are provided so that this disclosure is thorough and complete, and fully conveys various concepts of this disclosure to skilled artisans.

Generally, this disclosure enables a technique for presenting a conversation message in a messenger application. The technique involves the messenger application presenting a conversation area with a message portion and an empty portion, where the message portion can be immediately adjacent to the empty portion. The messenger application is programmed to present a set of number of messages within the message portion. When a number of messages within the message portion is about to exceed a predefined threshold, such as when a new message is sent or received, then an earliest message already presented in the message portion is hidden and positionally replaced with a next earliest message and the new message is displayed below the next earliest message, such as in a first-in-first-out (FIFO) manner. Since the messenger application hides the earliest message, the messenger application presents a notification, such as an icon, a graphic, an image, a photo, a video, a graphic interchange format (GIF) animation, or others, in the conversation area, whether in the message area or the empty area. The notification may be programmed for activation such that if the notification is activated based on an input into the messenger application, such as via a cursor or a gesture, then the earliest message is presented in the empty area, above the next earliest message, and the notification becomes more visually distinct than before activation. For example, upon activation, the notification can result in a feedback, such as a haptic feedback, an audio feedback, or others. Likewise, if the notification is deactivated based on an input into the messenger application, such as via a cursor or a gesture, then the earliest message presented in the empty area is hidden again and the notification becomes less visually distinct than before deactivation. For example, upon deactivation, the notification can result in a feedback, such as a haptic feedback, an audio feedback, or others. As such, this technique effectively manages a conversation involving a plurality of messages, especially when the messenger application receives the messages in a rapid succession, since the message area presents a limited number of messages that a user thereof can focus on. Further, since the messenger application is able to hide the earliest message, if the conversation contains a set of sensitive data, then the sensitive data can be hidden from visual access of third parties, while allowing the conversation to continue, without turning off the desktop display or closing the laptop. However, if the earliest message needs to be selectively presented, then the notification can be activated, as needed.

Figure 1:
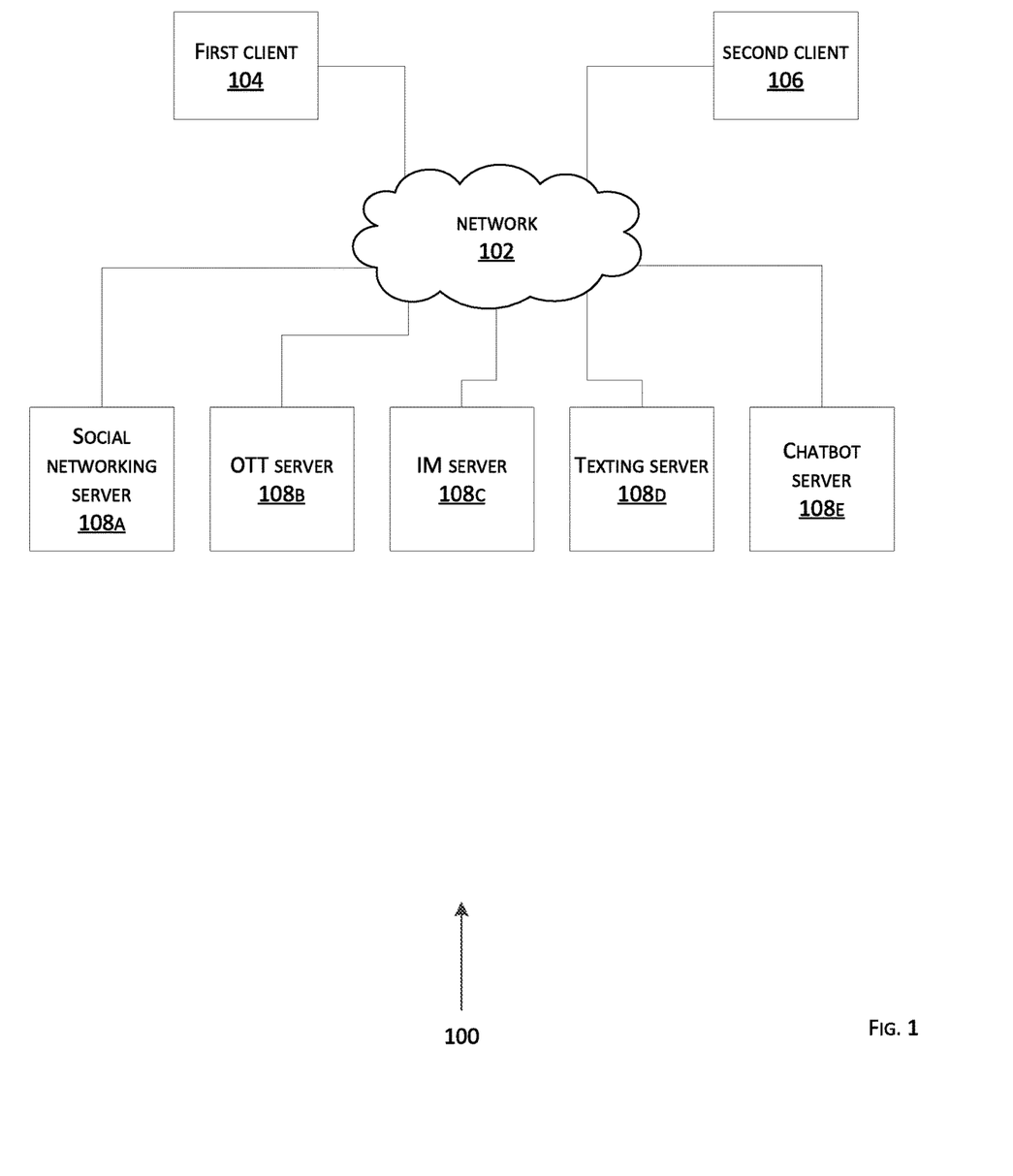
FIG. 1 shows a diagram of an embodiment of a network topology according to this disclosure.

FIG. 1 shows a diagram of an embodiment of a network topology according to this disclosure. In particular, a network topology 100 comprises a network 102, a first client 104, a second client 106, and a plurality of servers 108. The servers 108 include a social networking server 108a, an over-the-top (OTT) server 108b, an instant message (IM) server 108c, a texting server 108d, and a chatbot server 108e. Note that any connections of the network topology 100 can be direct or indirect.

The network 102 includes a plurality of nodes that allow for sharing of resources or information. The network 102 can be wired, waveguide, wireless, or others. For example, the network 102 can be a local area network (LAN), a wide area network (WAN), a cellular network, a satellite network, a personal area network (PAN), a fiber optic network, or others.

The first client 104 includes a desktop, a laptop, a smartphone, a tablet, or others. The first client 104 runs an operating system (OS) and an application, such as a mobile app, a browser, a texting application, an instant messenger, or others, as managed via the OS. In some embodiments, the client 104 includes a vehicle, whether land, aerial, marine, or space, or others. The first client 104 is operated via a first conversation participant.

The second client 106 includes a desktop, a laptop, a smartphone, a tablet, or others. The second client 106 runs an OS and an application, such as a mobile app, a browser, a texting application, an instant messenger, or others, as managed via the OS. In some embodiments, the client 104 includes a vehicle, whether land, aerial, marine, or space, or others. The second client 106 is operated via a second conversation participant.

Each of the servers 108 includes a multicore processor, a memory in communication with the multicore processor, and a transceiver in communication with the multicore processor. The memory stores an OS and a logic, such as an application, a module, a function, an object, or others. The transceiver, such as a transmitter and a receiver, signally communicates with the network 102, whether in a wired, waveguide, or wireless manner. The OS runs on the processor and the logic runs on the OS. In some embodiments, the logic is hardware-based, such as a circuit, or others.

In the server 108a, the logic includes a social networking service application that is programmed to enable user-to-user personal communications, such as chat. For example, the social networking service application can include Facebook, LinkedIn, or others. In the server 108b, the logic includes an OTT application that is programmed to enable user-to-user personal communications, such as chat. For example, the OTT application can include WhatsApp, Skype, or others. In the server 108c, the logic includes an IM application that is programmed to enable user-to-user personal communications, such as chat. For example, the IM application can include Google Hangouts, Microsoft Lync, or others. In the server 108d, the logic can include a texting application that is programmed to enable user-to-user communications, such as short message service (SMS) message or multimedia messaging service (MMS) message. For example, the texting application can include a short message service center (SMSC) application. In the server 108e, the logic includes a chatbot application that is programmed to simulate human conversation via auditory, such via sound, or textual, such as via chat, methods through artificial intelligence (AI). For example, the chatbot application can include WeChat, Amazon Echo, or others.

In one mode of operation, the first client 104 and the second client 106 are engaged in a conversation, such as a chat session, including an OTT chat session, or a text messaging session, over the network 102, using at least one of the servers 108. During the conversation, at least one of the first client 104 or the second client 106 runs a messenger application that presents a conversation area in a messenger application, whether in color, grayscale, or another visual manner. The conversation area includes a message portion and an empty portion, with the message portion being immediately adjacent to the empty portion. The message portion contains a first message and a second message, with the first message preceding the second message in time. Although the first message can be sourced from the first client 104 and the second message can be sourced from the second client 106, this scenario can vary, such as the first client 104 being associated with the first message and the second message or vice versa.

When the messenger application receives a third message that follows the second message in time, then the messenger application can determine a value corresponding to a total number of messages that would be concurrently displayed in the message portion with the third message, whether odd or even, such as one, two, three, four, five, or others, and then compare the value against a threshold, whether locally stored or remotely accessible. In response, based on the value satisfying the threshold, the messenger application modifies the message portion, such as via display refreshing, such that the first message is invisible therein, such as via hiding, the second message positionally replaces the first message in the message portion, and the third message positionally replaces the second message in the message portion, such as via a FIFO manner.

When the messenger application receives an input into the conversation area, whether into the message portion or the empty portion, then the messenger application modifies the empty portion, such as via display refreshing, such that the first message is presented therein. Note that when the messenger application receives the third message, then such receipt can include receiving the third message via a transceiver co-hosted with the messenger application. For example, such receipt can include the first client 104 receiving the third message from the second client 106 over the network 102 or vice versa. However, such receipt can also include receiving the third message from a user input device co-hosted with the messenger application. For example, the first client 104 can include a keyboard, whether physical or virtual, and the third message is input into the messenger application via the keyboard, for submission for sending to the second client 106 over the network 102.

Since the first message is now hidden in the message portion, in order to notify a user of the messenger application of such hiding, the messenger application presents a notification icon in the conversation area, whether in the message portion or the conversation portion, such as based on the value satisfying the threshold. In order to present the first message that was hidden, the messenger application receives the input into the conversation area, whether via selecting the notification icon, such as via hovering over the notification icon, or activating the notification icon, such via clicking the notification icon. Upon such input, the first message is presented in the empty portion, such as above the message portion, i.e., the empty portion is not empty anymore. Conversely, in order to hide the first message in the empty portion, the notification icon is again selected, such as via hovering over the notification icon, or activated, such as via clicking the notification icon. As such, the first message is now hidden in the empty portion, i.e., the empty portion is now empty. Note that the input can also be a gesture, such as a slide from the message portion to the empty portion or vice versa. Further, note that the messenger application can be displayed within a browser running on the first client 104 or the second client 106. Also, note that the messenger application is displayed within a phone, wherein the first client 104 or the second client 106 is the phone. Moreover, when the first client 104 or the second client 106 chats with a chatbot, such as over the server 108e, then at least one of the first message or the second message originates from the chatbot. Additionally, the input to present the first message that was hidden can involve a scrollbar, such as via scrolling the scrollbar up/down can present/hide the first message in the empty portion and vice versa.

Figure 2:
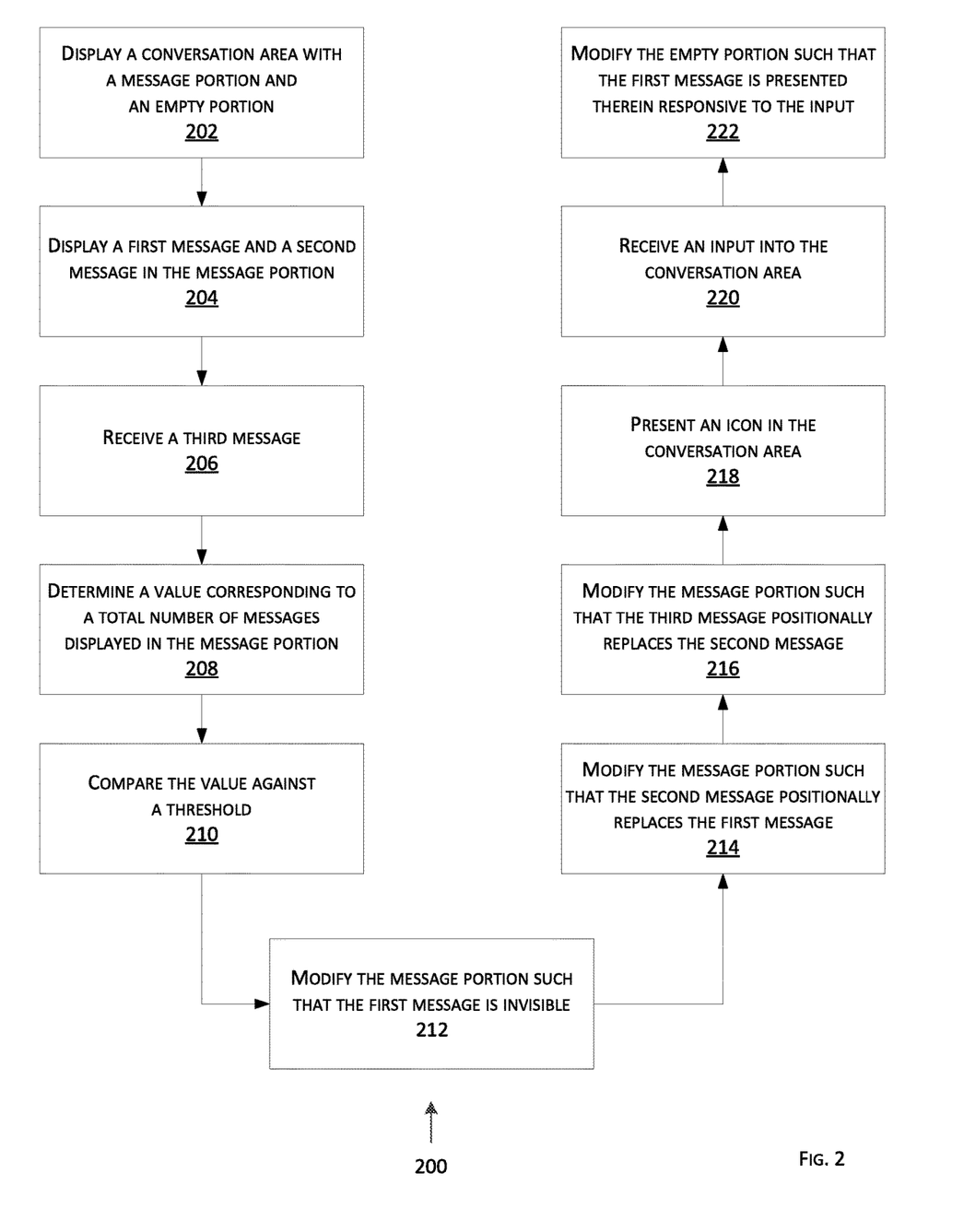
FIG. 2 shows a flowchart of an embodiment of a process for presenting a plurality of conversation messages according to this disclosure.

FIG. 2 shows a flowchart of an embodiment of a process for presenting a plurality of conversation messages according to this disclosure. In particular, a process 200 is used to present a plurality of conversation messages on a client, such as the first client 104 or the second client 106. The process 200 includes a set of blocks 202-222, which are performed via the network topology 100.

In the block 202, a client runs a messenger application that presents a conversation area, whether in color, grayscale, or another visual manner, with a message portion and an empty portion. The messenger application can include a text messenger, a chat messenger, or others in any context, such as a social networking service, an OTT application, a productivity instant messenger, a personal information manager (PIM) application, a browser, or others. The conversation area depicts a conversation between a user of the messenger application and another party over the network 102 via at least one of the servers 108, such as a chatbot, a social networking service user, or others, as disclosed herein. The message portion and the empty portion can identical to or different from each other in area, shape, or visual presentation. For example, the message portion can be rectangular and the empty portion can be triangular. The message portion and the empty are immediately adjacent to each other, whether along a vertical, horizontal, or a diagonal plane, or can be spaced apart by another portion therebetween, whether along a vertical, horizontal, or a diagonal plane. The message portion or the empty portion can be delineated to be visually distinct from each other or another portion of the conversation area or such delineations can be absent. The message portion or the empty portion can be filled with a background, such as solid color, a pattern, an image, a video, or others, whether identical to each other or different from each other. Further, note that the messenger application can be displayed within a browser running on the first client 104 or the second client 106. Also, note that the messenger application is displayed within a phone, wherein the first client 104 or the second client 106 is the phone.

In the block 204, the messenger presents a first message and a second message in the message portion, with the first message preceding the second message in time. Although the first message can be sourced from the first client 104 and the second message can be sourced from the second client 106, this scenario can vary, such as the first client 104 being associated with the first message and the second message or vice versa. Although the first message can be positioned over the second message along a vertical plane, other message presentation schemes are possible, such as side-by-side or others. Each of the first message and the second message can be presented within a closed shape, such as a bubble, or in an open shape, such as U-shape, or as a rectilinearly typed text. When the first message is sourced from the first client 104 and the second message is sourced from the second client 106, in order to aid a user of the message application to distinguish between a set of conversation participants, the first message and the second message are presented to be visually distinct from each other, such as via color, highlighting, font types, font sizes, underlining, bolding, or other ways. Note that the first message and the second message can include content of any type, such as an alphanumeric string, an image file, a sound file, a document file, a hyperlink, or others. Moreover, when the first client 104 or the second client 106 chats with a chatbot, such as over the server 108e, then at least one of the first message or the second message originates from the chatbot.

In the block 206, the messenger application receives a third message that follows the second message in time. Note that such receipt can include receiving the third message via a transceiver co-hosted with the messenger application. For example, such receipt can include the first client 104 receiving the third message from the second client 106 over the network 102 or vice versa. However, such receipt can also include receiving the third message from a user input device co-hosted with the messenger application. For example, the first client 104 can include a keyboard, whether physical or virtual, and the third message is input into the messenger application via the keyboard. Also, note that the third message can include content of any type, such as an alphanumeric string, an image file, a sound file, a document file, a hyperlink, or others.

In the block 208, the messenger application determines a numeric value corresponding to a total number of messages that would be concurrently displayed with the third message in the message portion. The numeric value can be odd or even, such as one, two, three, four, five, seven, or others. Such determination can occur via counting message identifiers corresponding to the messages already concurrently displayed in the message portion, as flagged, in addition to a message identifier for the third message, or via querying a data structure sourcing the messages for presentation via the messenger application, such as an array, a hash, or others, whether locally or remotely stored, in addition to a message identifier for the third message. Note that the messages include the first message and the second message.

In the block 210, the messenger application compares the numeric value against a threshold, whether locally or remotely stored. The threshold can be statically set, such as factory set or user set/adjusted, or dynamically adjusted, such in real-time based on a conversation speed, such as during group chat with a large number of participants, such as at least three, such as five, seven, ten, fifteen, or more, or during a conversation with chatbot, such as when messages are received in rapid succession.

In the block 212, based on the value satisfying the threshold, the messenger application modifies the message portion, such as via display refreshing, such that the first message is invisible in the message portion, such as via hiding or overwriting with background-color.

In the block 214, based on the value satisfying the threshold, the messenger application modifies the message portion, such as via display refreshing, such that the second message positionally replaces the first message in the message portion, such as via moving the second message or rewriting the second message over the first message.

In the block 216, based on the value satisfying the threshold, the messenger application modifies the message portion, such as via display refreshing, such that the third message positionally replaces the second message in the message portion, such as via rewriting the third message over the second message.

In the block 218, since the first message is hidden, in order to notify a user of the messenger application of such hiding, the messenger application presents a notification icon in the conversation area, whether in the message portion or the empty portion, such as based on the value satisfying the threshold. The notification icon can be solid colored or patterned or include a label, such as an alphanumeric string, or an image, such as a photo or video. In some embodiments, the notification icon can overlay at least one of the messages, such as the first message, the second message, or others. In some embodiments, the notification icon avoids overlaying over the messages.

In the block 220, in order to present the first message that was hidden, the messenger application receives an input into the conversation area, whether into the message portion or the empty portion. The input into the conversation area can be via selecting the notification icon, such as via hovering over the notification icon, or activating the notification icon, such via clicking the notification icon. Note that the input can also be a gesture, such as a slide from the message portion to the empty portion or vice versa.

In the block 222, the messenger application modifies the empty portion, such as via display refreshing, such that the first message is presented therein responsive to the input. The first message is presented in the empty portion, such as above the message portion. As such, the empty portion is not empty anymore and includes the first message as unhidden. Conversely, in order to hide the first message in the empty portion, the notification icon is again selected, such as via hovering over the notification icon, or activated, such as via clicking the notification icon. As such, the first message is now again hidden in the empty portion, i.e., the empty portion is now empty. In some embodiments, the input to re-present the first message that was hidden can involve a scrollbar, such as via scrolling a bar in the scrollbar up/down to present/hide the first message in the empty portion and vice versa. Note that the scrollbar can be internal to or external from the conversation area. Further, note that the bar of the scrollbar or the scrollbar can become visually distinct with respect to the conversation area, whether the empty portion or the message portion, when the first message is hidden/unhidden, such as via color, patterns, or others.

Figure 3A:
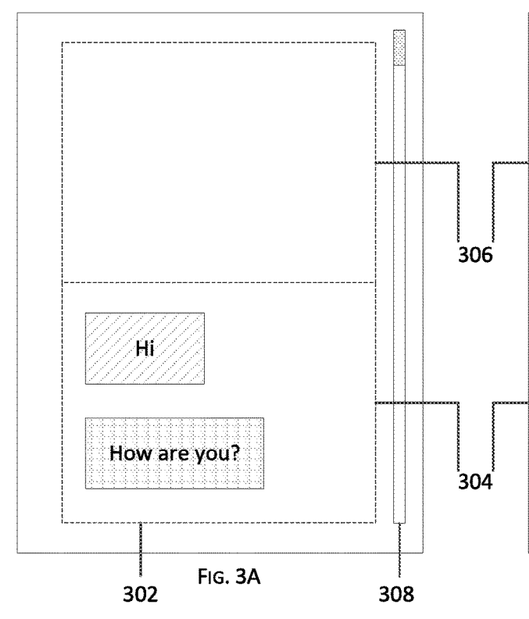
FIGS. 3A-3C show a diagram of an embodiment of a conversation page of a messenger application according to this disclosure.
Figure 3B:
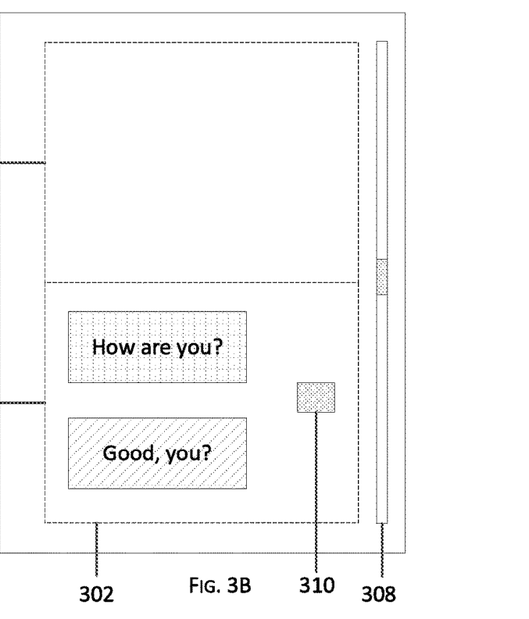
Figure 3C:
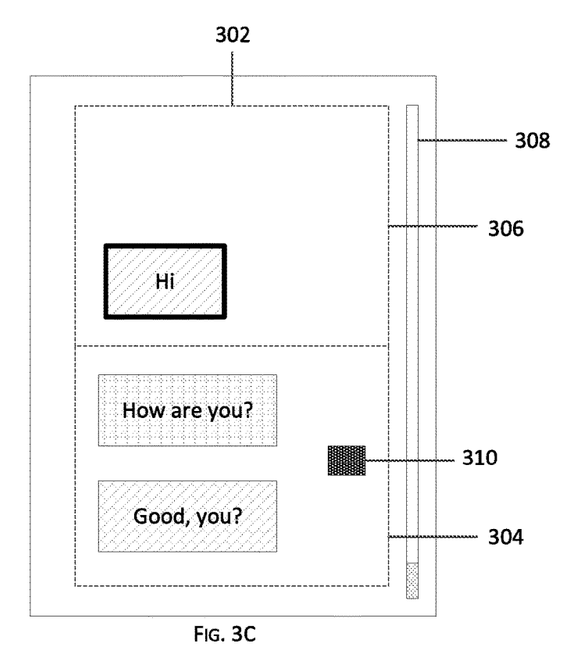

FIGS. 3A-3C show a diagram of an embodiment of a conversation page of a messenger application according to this disclosure. In particular, as shown in FIG. 3a, a conversation page 300 of a messenger application includes a conversation area 302 that has a message portion 304 and an empty portion 306, both of which are stationary. The message portion 304 is immediately adjacent to the empty portion 306 along a vertical plane, although variations on such positioning are possible, such as a portion being positioned between the message portion 304 and the empty portion 306 or a different plane is used, such as a horizontal or a diagonal plane. The message portion 304 contains a first message with an alphanumeric string "Hi" from a first user and a second message with an alphanumeric string "How are you?" from a second user, as noted via different shading of message shapes. The page 300 further includes a scrollbar 308 positioned laterally external to the conversation area 302, although the scrollbar 308 can be positioned internal to the conversation area 302. Note that a bar in the scrollbar 308 is upmost positioned.

As shown in FIG. 3B, a third message with an alphanumeric string "Good, you?" is received and presented in the message portion 304, with the third message being associated with the first user, as noted via same shading. In this use case, a threshold value is two and since the message portion 304 would contain three messages if the third message would be concurrently displayed with the first message and the second message, the messenger application made the first message invisible, such as via hiding the first message, presented the second message where the first message was presented, and presented the third message where the second message was presented. Note that since the first message is hidden, the page 300 now contains a notification icon 310 positioned in the message portion 304, although the notification icon 310 can also be positioned, whether additionally or alternatively, in the empty portion 306. Further, note that the bar of the scrollbar 308 is mid-positioned, indicative of the message portion 304 not containing an entire conversation.

As shown in FIG. 3C, the notification icon 310 is activated, such as via a user input, such as a click, a single touch, a gesture, or a voice control, as illustrated by a shading of the notification icon 310 in FIG. 3C being visually distinct from a shading of the notification icon 310 in FIG. 3B. Resultantly, in response, the first message is made visible in the empty portion 306 above the second message. Further, note that the bar of the scrollbar 308 is bottommost positioned, indicative of the conversation area 302 presenting the entire conversation. Note that in order to hide the first message in the empty portion 306, the notification icon 310 should be again selected, such as via hovering over the notification icon 310, or activated, such as via clicking (or touching or otherwise selecting) the notification icon 310. As such, the first message will now again hidden in the empty portion 306, i.e., the empty portion is now empty. Further, note that the bar of the scrollbar 308 or the scrollbar 308 can become visually distinct with respect to the conversation area 302, whether the empty portion 306 or the message portion 304, when the first message is hidden/unhidden, such as via color, patterns, or others.

In one embodiment, the conversation area 302 can be truncated to show a limited number of messages in only the message portion 304. This truncation can be activated using notification icon 310. The empty portion 306 will not show any contents from the conversation. Upon activating the notification icon 310 from this truncated state, the empty portion 306 can be populated with earlier messages from the conversation. Optionally, these messages in portion 306 can be shown in an alternative format (e.g., different color, pattern, size). Accordingly, the notification icon 310 offers functionality to toggle between full screen views of the conversation and partial screen views to limit the conversation shown. This adaptation of the user interface configuration is useful in overcoming the technical problem where it is undesirable to show more of a sensitive conversation on a screen in a presence of a third party.

Various embodiments of the present disclosure may be implemented in a data processing system suitable for storing and/or executing program code that includes at least one processor coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The present disclosure may be embodied in a system, a method, and/or a computer program product. The computer program product may include a computer readable storage medium (or media) having computer readable program instructions thereon for causing a processor to carry out aspects of the present disclosure. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, among others. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions. The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Words such as "then," "next," etc. are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, etc. When a process corresponds to a function, its termination may correspond to a return of the function to the calling function or the main function.

Features or functionality described with respect to certain embodiments may be combined and sub-combined in and/or with various other embodiments. Also, different aspects and/or elements of embodiments, as disclosed herein, may be combined and sub-combined in a similar manner as well. Further, some embodiments, whether individually and/or collectively, may be components of a larger system, wherein other procedures may take precedence over and/or otherwise modify their application. Additionally, a number of steps may be required before, after, and/or concurrently with embodiments, as disclosed herein. Note that any and/or all methods and/or processes, at least as disclosed herein, can be at least partially performed via at least one entity or actor in any manner.

The terminology used herein can imply direct or indirect, full or partial, temporary or permanent, action or inaction. For example, when an element is referred to as being "on," "connected" or "coupled" to another element, then the element can be directly on, connected or coupled to the other element and/or intervening elements can be present, including indirect and/or direct variants. In contrast, when an element is referred to as being "directly connected" or "directly coupled" to another element, there are no intervening elements present.

Although the terms first, second, etc. can be used herein to describe various elements, components, regions, layers and/or sections, these elements, components, regions, layers and/or sections should not necessarily be limited by such terms. These terms are used to distinguish one element, component, region, layer or section from another element, component, region, layer or section. Thus, a first element, component, region, layer, or section discussed below could be termed a second element, component, region, layer, or section without departing from the teachings of the present disclosure.

Furthermore, relative terms such as "below," "lower," "above," and "upper" can be used herein to describe one element's relationship to another element as illustrated in the accompanying drawings. Such relative terms are intended to encompass different orientations of illustrated technologies in addition to the orientation depicted in the accompanying drawings. For example, if a device in the accompanying drawings were turned over, then the elements described as being on the "lower" side of other elements would then be oriented on "upper" sides of the other elements. Similarly, if the device in one of the figures were turned over, elements described as "below" or "beneath" other elements would then be oriented "above" the other elements. Therefore, the terms "below" and "lower" can encompass both an orientation of above and below.

The terminology used herein is for describing particular embodiments and is not intended to be necessarily limiting of the present disclosure. As used herein, the singular forms "a," "an" and "the" are intended to include the plural forms as well, unless the context clearly indicates otherwise. Also, as used herein, the term "a" and/or "an" shall mean "one or more," even though the phrase "one or more" is also used herein. The terms "comprises," "includes" and/or "comprising," "including" when used in this specification, specify the presence of stated features, integers, steps, operations, elements, and/or components, but do not preclude the presence and/or addition of one or more other features, integers, steps, operations, elements, components, and/or groups thereof. Furthermore, when the present disclosure states herein that something is "based on" something else, then such statement refers to a basis which may be based on one or more other things as well. In other words, unless expressly indicated otherwise, as used herein "based on" inclusively means "based at least in part on" or "based at least partially on."

As used herein, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances.

Unless otherwise defined, all terms (including technical and scientific terms) used herein have the same meaning as commonly understood by one of ordinary skill in the art to which this disclosure belongs. The terms, such as those defined in commonly used dictionaries, should be interpreted as having a meaning that is consistent with their meaning in the context of the relevant art and should not be interpreted in an idealized and/or overly formal sense unless expressly so defined herein.

As used herein, the term "about" and/or "substantially" refers to a +/−10% variation from the nominal value/term. Such variation is always included in any given.

If any disclosures are incorporated herein by reference and such disclosures conflict in part and/or in whole with the present disclosure, then to the extent of conflict, and/or broader disclosure, and/or broader definition of terms, the present disclosure controls. If such disclosures conflict in part and/or in whole with one another, then to the extent of conflict, the later-dated disclosure controls.

Although preferred embodiments have been depicted and described in detail herein, it will be apparent to those skilled in the relevant art that various modifications, additions, substitutions and the like can be made without departing from the spirit of the disclosure, and these are, therefore, considered to be within the scope of the disclosure, as defined in the following claims.

In this disclosure, where a document, an act, and/or an item of knowledge is referred to and/or discussed, then such reference and/or discussion is not an admission that the document, the act, and/or the item of knowledge and/or any combination thereof was at a priority date, publicly available, known to a public, part of common general knowledge, and/or otherwise constitutes any prior art under any applicable statutory provisions; and/or is known to be relevant to any attempt to solve any problem with which this disclosure is concerned with. Further, nothing is disclaimed.

What is claimed is:

1. A method comprising:
    displaying, by a computer, a graphical user interface having a first portion and a second portion, wherein the computer displays at least a first message and a second message within the first portion, and wherein when the computer receives a third message, the computer displays the third message in the first portion, wherein the computer receives the third message after the second message and further receives the second message after the first message;
    upon receiving a request, relocating, by the computer, the first message, whereby:
        the second portion only displays the first message,
        the second message positionally replaces the first message within the first portion, and
        when the computer receives the third message, the computer displays the third message within the first portion and the third message positionally replaces the second message; and
    displaying, by the computer, a graphical indicator configured to switch between a first status and a second status based on a first user input and a second user input respectively, wherein the first message is included in the first portion during the first status responsive to the first user input, wherein the first message is not included in the first portion during the second status responsive to the second user input, and wherein the graphical indicator is visually distinct during the first status from the second status.

2. The method of claim 1, wherein the graphical indicator is displayed within the first portion.

3. The method of claim 1, wherein the graphical indicator is displayed within the second portion.

4. The method of claim 1, wherein the first portion is immediately adjacent to the second portion.

5. The method of claim 1, wherein the second portion is above the first portion along a vertical plane.

6. The method of claim 1, wherein the second portion is on a side of the first portion along a horizontal plane.

7. The method of claim 1, wherein at least one of the first portion or the second portion is included in a browser application displayed on the computer.

8. The method of claim 1, wherein at least one of the first user input or the second user input corresponds to a gesture.

9. The method of claim 1, wherein at least one of the first message or the second message originates from a chatbot.

10. The method of claim 1, wherein at least one of the first message or the second message is an over-the-top (OTT) message or a short message service (SMS) message.

11. A system comprising:
    a computer comprising a non-transitory storage medium storing a set of instructions configured for execution by a processor such that the processor is configured to:
        display a graphical user interface having a first portion and a second portion, wherein the computer displays at least a first message and a second message within the first portion, and wherein when the computer receives a third message, the computer displays the third message in the first portion, wherein the computer receives the third message after the second message and further receives the second message after the first message;
        upon receiving a request, relocating, by the computer, the first message, whereby:
            the second portion only displays the first message,
            the second message positionally replaces the first message within the first portion, and
            when the computer receives the third message, the computer displays the third message within the first portion and the third message positionally replaces the second message; and
        display a graphical indicator configured to switch between a first status and a second status based on a first user input and a second user input respectively, wherein the first message is included in the first portion during the first status responsive to the first user input, wherein the first message is not included in the first portion during the second status responsive to the second user input, and wherein the graphical indicator is visually distinct during the first status from the second status.

12. The system of claim 11, wherein the graphical indicator is displayed within the first portion.

13. The system of claim 1, wherein the graphical indicator is displayed within the second portion.

14. The system of claim 11, wherein the first portion is immediately adjacent to the second portion.

15. The system of claim 11, wherein the second portion is above the first portion along a vertical plane.

16. The system of claim 11, wherein the second portion is on a side of the first portion along a horizontal plane.

17. The system of claim 11, wherein at least one of the first portion or the second portion is included in a browser application displayed on the computer.

18. The system of claim 11, wherein at least one of the first user input or the second user input corresponds to a gesture.

19. The system of claim 11, wherein at least one of the first message or the second message originates from a chatbot.

20. The system of claim 11, wherein at least one of the first message or the second message is an over-the-top (OTT) message or a short message service (SMS) message.

* * * * *